US007800650B1

United States Patent
Prieto

(10) Patent No.: US 7,800,650 B1
(45) Date of Patent: Sep. 21, 2010

(54) MULTI-FUNCTIONAL PORTABLE VIEWFINDER FOR USE WITH A DIGITAL CAMCORDER

(76) Inventor: John Prieto, 162 Sugarloaf Mtn. Rd., Chester, NY (US) 10918

( * ) Notice: Subject to any disclaimer, the term of this patent is extended or adjusted under 35 U.S.C. 154(b) by 905 days.

(21) Appl. No.: 11/699,966

(22) Filed: Jan. 30, 2007

Related U.S. Application Data

(60) Provisional application No. 60/763,060, filed on Jan. 30, 2006.

(51) Int. Cl.
  H04N 5/225 (2006.01)
  H04N 9/47 (2006.01)
  H04N 5/222 (2006.01)
  G09G 5/00 (2006.01)

(52) U.S. Cl. ............... 348/207.99; 348/115; 348/53; 348/333.06; 348/375; 345/8

(58) Field of Classification Search ............ 348/207.99, 348/333.01, 333.03, 333.06, 53, 115, 375, 348/376, 231.2; 345/8; 396/373
See application file for complete search history.

(56) References Cited

U.S. PATENT DOCUMENTS

| | | | | |
|---|---|---|---|---|
| 3,542,457 A | * | 11/1970 | Ziegler et al. ................. | 348/78 |
| 5,003,300 A | * | 3/1991 | Wells .......................... | 348/115 |
| 5,189,512 A | * | 2/1993 | Cameron et al. ............. | 348/115 |
| 5,610,678 A | * | 3/1997 | Tsuboi et al. ................ | 348/375 |
| 6,172,657 B1 | * | 1/2001 | Kamakura et al. ............. | 345/8 |
| 6,346,929 B1 | * | 2/2002 | Fukushima et al. ............ | 345/8 |
| 6,549,231 B1 | * | 4/2003 | Matsui ........................ | 348/151 |
| 6,558,050 B1 | * | 5/2003 | Ishibashi .................... | 396/420 |
| 7,542,665 B2 | * | 6/2009 | Lei ........................ | 348/333.03 |

* cited by examiner

*Primary Examiner*—Nhan T Tran

(57) ABSTRACT

A multi-functional portable viewfinder and digital camcorder system includes a camcorder with a transceiver electrically coupled thereto, and a headset. The headset includes a base member, and a view-finding arm pivotally mated thereto. The arm includes a lens operably mated to a distal end thereof. A headset transceiver is hard-wired to the camcorder transceiver or in wireless communication therewith. A user interface is electrically coupled to the headset transceiver, and includes control buttons disposed on an outside surface of the arm. The system includes a mechanism for automatically, selectively and manually actuating the camcorder to a recording mode. A digital imaging data interface circuit is electrically coupled to each of the recording mechanisms respectively for converting the captured image into a format understood by the digital camcorder.

14 Claims, 6 Drawing Sheets

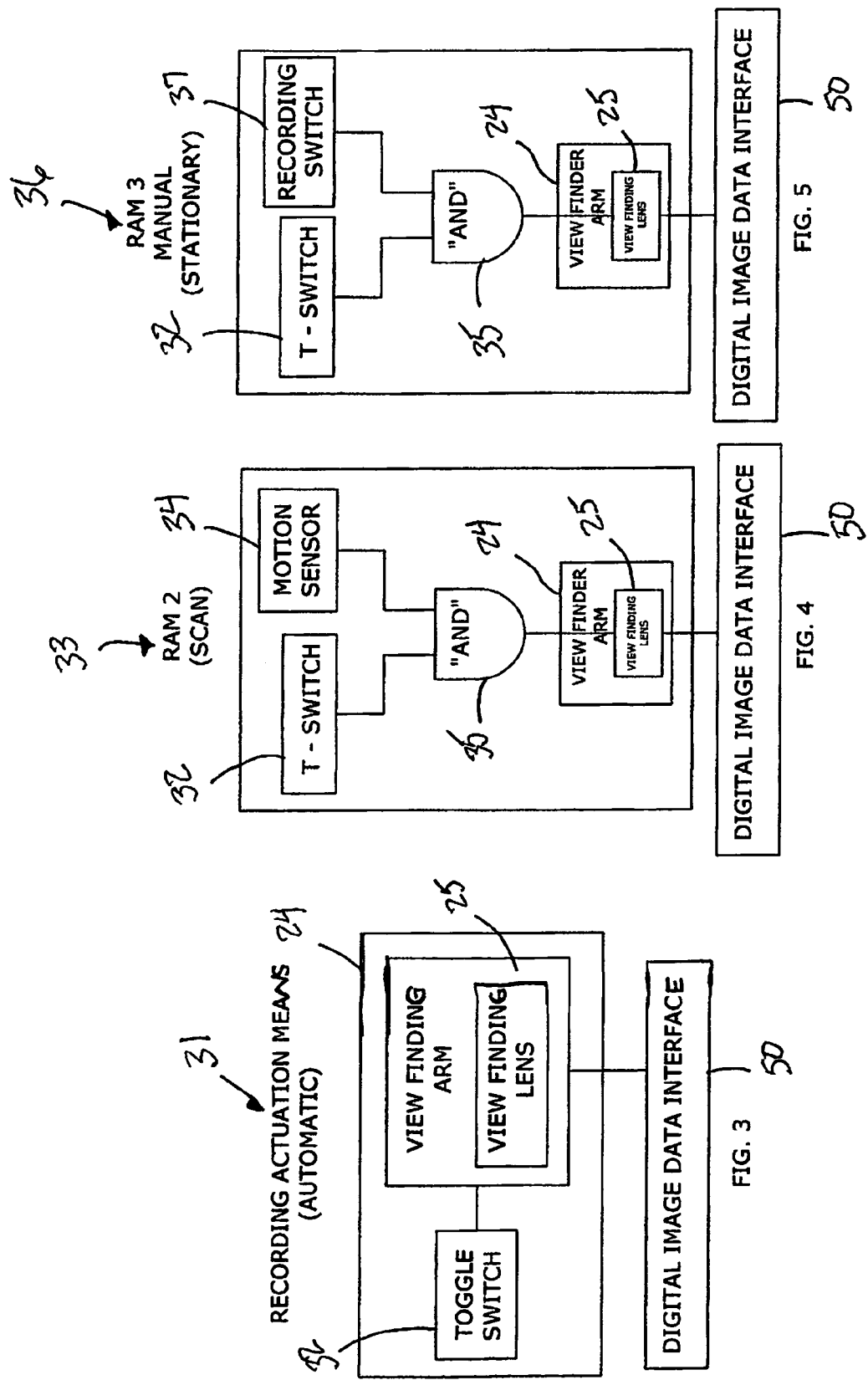

MULTI-FUNCTIONAL PORTABLE VIEWFINDER FOR USE WITH A DIGITAL CAMCORDER

CROSS REFERENCE TO RELATED APPLICATIONS

This application claims the benefit of U.S. Provisional Application No. 60/763,060, filed Jan. 30, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to viewfinders and, more particularly, to a multi-functional portable viewfinder for use with a digital camcorder so that a user can automatically toggle the camcorder between various operating modes while maintaining both hands spaced from the camcorder.

2. Prior Art

The advent of small hand held video camera/videotape recorder combinations known as "camcorders" has made it possible to efficiently and inexpensively videotape activities at locations where bulky prior art video equipment couldn't go. Camcorders are generally characterized by self-contained camera optics and camera/recorder electronics in a single small portable unit. Camcorders are constructed primarily for the consumer market and therefore mimic the size and structure of prior art hand-held movie cameras such as the well-known Super-8 camera, as well as conventional video cameras.

However, when said cameras are employed for the purpose of recording dynamic events they present certain problems. First of all, it is difficult for the camera operator to move his body with a camera resting on his shoulder. Secondly, it is hard to change camera height when shooting with a shoulder supported unit. Thirdly, it is difficult to move a camera out of the vertical plane smoothly with a prior art hand-held camera.

One prior art example shows a camcorder equipped with a head mounted viewfinder that is visible to only one eye of the camera operator. The viewfinder is mounted on an adjustable head support and positioned directly in front of one eye of the camera operator so that the camera operator sees the recorded scene viewed by the video camera with the eye and is free to view the remaining surroundings with the other eye. A counter-balanced staff supports the camcorder in such a way that the staff and camcorder can be held in one hand. The single eye viewfinder arrangement cooperates with the counter balanced camera support staff to maximize the efficiency and effectiveness of the television camera operator and to minimize undesirable side effects such as camera wobble. Unfortunately, this prior art example does not provide separate mechanisms for allowing a user to automatically, selectively, or manually record as desired.

Another prior art example shows a remote camera viewfinder that has a fiber optic bundle with a fitting at one end adapted to attach to the eyepiece of a camera and a fitting at the other end for allowing a photographer to see through the fiber optic bundle. The camera end fitting has a lens for focusing the image onto the focal plane of the fiber optic bundle. The other fitting includes a lens adjacent to the end of the fiber optic bundle to magnify the image transmitted through the bundle and also includes an eyecup mounted to a helmet or headgear arrangement which holds the eyecup adjacent to the photographer's eye allowing both hands free for manipulation of the camera. Unfortunately, this prior art example does not provide a means of wireless communication between the lens and the digital camcorder. In addition, a motion sensor is not incorporated into the lens for use in recording automatically.

Accordingly, a need remains for a multi-functional portable viewfinder for use with a digital camcorder in order to overcome the above-noted shortcomings. The present invention satisfies such a need by providing a system that is convenient and easy to use, is lightweight yet durable in design, and allows a user to automatically toggle the camcorder between various operating modes while maintaining both hands spaced from the camcorder. Such a system allows a user to record videos hands free and with a much steadier picture than with traditional camcorders. With the headset a user no longer has to worry about missing a shot. A user can quickly slide the lens over the eye and start recording immediately as opposed to stumbling around to get out a large video camera and programming it. In addition, a user can manipulate the various recording modes through buttons located on the headset, thereby removing the need to access the digital camcorder during operating procedures. Also, a user can choose between recording modes based on need and desire. The present invention is simple to use and designed for many years of repeated use.

BRIEF SUMMARY OF THE INVENTION

In view of the foregoing background, it is therefore an object of the present invention to provide a system for a multi-functional portable viewfinder for use with a digital camcorder. These and other objects, features, and advantages of the invention are provided by a multi-functional portable viewfinder and digital camcorder system for enabling a user to automatically toggle the camcorder between various operating modes while maintaining both hands spaced from said digital camcorder.

The system includes a digital camcorder conveniently provided with a transceiver electrically coupled thereto, and a portable headset removably positioned on a user head. Such a portable headset includes a base member effectively spanning across a top surface of the user head for removably securing the headset to the user head, and a view-finding arm pivotally mated directly to the base member. Such a view-finding arm conveniently includes a view-finding lens operably mated to a distal end thereof. A transceiver is in communication with the digital camcorder transceiver. The digital camcorder transceiver is hard-wired to the headset transceiver, or alternatively, is in wireless communication with the headset transceiver. A user interface is electrically coupled directly to the headset transceiver, and includes a plurality of control buttons advantageously disposed on an outside surface of the view-finding arm.

The system further includes a mechanism for automatically actuating the digital camcorder to a recording mode such that an image is automatically captured and recorded when the view-finding arm is articulated to a lowered position effectively defined directly in front of a line-of-sight of the user. Such an automatic recording mechanism includes a toggle switch operably coupled to the view-finding arm such that the toggle switch is automatically biased between on and off positions when the view-finding arm is lowered and raised respectively.

The system further includes a mechanism for selectively actuating the digital camcorder to a recording mode such that an image is selectively captured and recorded when the view-finding arm is articulated to a lowered position effectively defined directly in front of a line-of-sight of the user and when the line-of-sight is adapted away from an initial rested position. Such a selective recording mechanism conveniently includes a toggle switch operably coupled to the view-finding arm such that the toggle switch is selectively biased between on and off positions when the view-finding arm is lowered and raised respectively.

The system further includes a motion sensor operably coupled to the headset for effectively detecting movement of the headset. Such a motion sensor generates an output signal based upon motion detected within the view-finding lens. A logic gate is electrically coupled directly to the toggle switch and the motion sensor wherein the logic gate generates and transmits a control output signal to the view-finding arm and the digital imaging data interface circuit when the toggle switch and the motion sensor transmit output signals that have true values corresponding to predetermined recording parameters.

The system further includes a mechanism for manually actuating the digital camcorder to a recording mode such that an image is manually captured and recorded when the view-finding arm is articulated to a lowered position effectively defined directly in front of a line-of-sight of the user and when a designated one of the control buttons is engaged to an on position. Such a manual recording mechanism includes a toggle switch operably coupled to the view-finding arm such that the toggle switch is selectively biased between on and off positions when the view-finding arm is lowered and raised respectively.

The system further includes a recording switch operably coupled to the headset. Such a recording switch generates an output signal based upon a corresponding user input. A logic gate is electrically coupled directly to the toggle switch and the recording switch wherein the logic gate generates and transmits a control output signal to the view-finding arm and the digital imaging data interface circuit when the toggle switch and the recording switch transmit output signals that have true values.

The system further includes a digital imaging data interface circuit electrically coupled to each of the automatic recording mechanism and the selective recording mechanism and the manual recording mechanism respectively for effectively converting the captured image into a format understood by the digital camcorder and thereby advantageously enabling the digital camcorder to conveniently record the captured image identified along the line-of-sight of the view-finding arm.

The digital imaging data interface circuit includes a charged coupled device defining a semi-conductor image sensor. Such a charged coupled device receives an image input signal that has a predetermined light intensity level wherein light associated with the captured image is converted into electrons based upon a brightness of the captured image. A beam-splitter is electrically coupled to the charged coupled device, and includes a plurality of chips. Each of such chips receives a unique version of the image input signal showing a corresponding level of red, green and blue lights respectively and further generates a combined analog image output signal based upon a combined light intensity level of red, green and blue lights.

The digital imaging data interface circuit further includes an analog-to-digital converter electrically coupled to the beam-splitter that receives the analog image output signal. Such an analog-to-digital converter generates a digital image output signal based upon the combined light intensity level of the analog image output signal. A processor is electrically coupled to the analog-to-digital converter, and a memory is electrically coupled to the processor. Such a memory includes software instructions that interpolates a true color of the light associated with the digital image output signal. Such software instructions include and execute a control logic algorithm.

The control logic algorithm includes the steps of filtering the light intensity levels associated with the red, green, and blue colors, recording the light intensity levels associated with the red, green, and blue colors, and combining the light intensity levels of the red, green, and blue colors to create a full color spectrum of the captured image. In an alternate embodiment, the control logic algorithm includes the steps of interpolating the red, green, and blue light intensity levels, outputting a mosaic of red, green, and blue pixels has the light intensity levels associated therewith, and de-mosaicing the red, green, and blue pixels into an equally sized mosaic has true red, green, and blue colors based upon the red, green and blue light intensity levels of the captured image.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a schematic block diagram of the automatic recording mechanism;

FIG. 4 is a schematic block diagram of the selective recording mechanism;

FIG. 5 is a schematic block diagram of the manual recording mechanism;

DETAILED DESCRIPTION OF THE INVENTION

Figure 1:
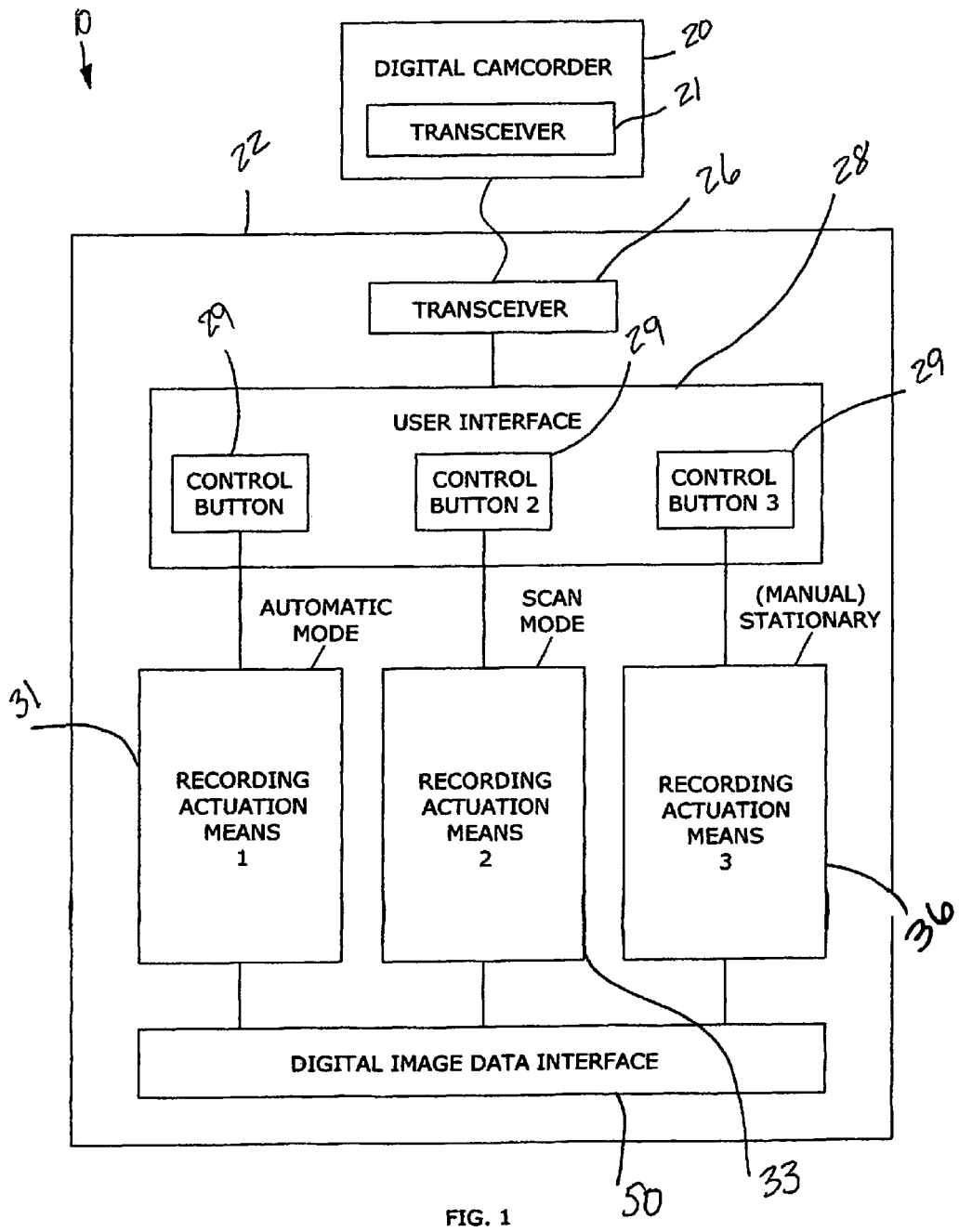
FIG. 1 is a schematic block diagram of a multi-functional portable viewfinder for use with a digital camcorder, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-8 by the reference numeral 10 and is intended to provide a multi-functional viewfinder for use with a digital camcorder. It should be understood that the system 10 may be used to record many different types of events and should not be limited in use to recording only those events described herein.

Referring initially to FIGS. 1, 6, 7 and 8, the system 10 includes a digital camcorder 20 conveniently provided with a transceiver 21 electrically coupled thereto, and a portable headset 22 removably positioned on a user head 11. Such a portable headset 22 includes a base member 23 spanning across a top surface 12 of the user head 11 for removably securing the headset 22 to the user head 11, and a view-finding arm 24 pivotally mated directly to the base member 23, without the use of intervening elements. Such a base member 23 allows a user to comfortably attach the headset 22 to a user head 11, thereby leaving a user hands free for other activities. Such a view-finding arm 24 includes a view-finding lens 25 operably mated to a distal end 26 thereof. Such a view-finding lens 25 is positioned in front of a user eye 13, which is essential such that the view-finding lens 25 views the same area as a user eye 13 during operating conditions.

Again referring to FIGS. 1, 6, 7 and 8, a transceiver 26 housed within the headset 22 is in communication with the digital camcorder transceiver 21. The digital camcorder transceiver 21 is hard-wired to the headset transceiver 26, or alternatively, is in wireless communication with the headset transceiver 26. Such alternative methods of communication allow a user to choose between the methods as desired. A user interface 28 is electrically coupled directly to the headset transceiver 26, without the use of intervening elements, and includes a plurality of control buttons 29 advantageously disposed on an outside surface 30 of the view-finding arm 24. Such control buttons 29 allow a user to manually select the operating mode (herein described below) as desired with the simple push of one of the control buttons 29. Locating the control buttons 29 on the view-finding arm 24 eliminates the need for a user to access the digital camcorder 20, and also allows a user to operate the portable headset 22 with any digital camcorder 20 in communication therewith.

Referring to FIG. 3, the system 10 further includes a mechanism 31 for automatically actuating the digital camcorder 20 to a recording mode, which is critical such that an image is automatically captured and recorded when the view-finding arm 24 is articulated to a lowered position defined directly in front of a line-of-sight of the user, without the use of intervening elements. Such an automatic recording mechanism 31 includes a toggle switch 32 operably coupled to the view-finding arm 24, which is crucial such that the toggle switch 32 is automatically biased between on and off positions when the view-finding arm 24 is lowered and raised respectively. The automatic recording mechanism 31 allows a user to automatically record images without having to manually initiate a recording sequence, and is very useful in conditions that are fast paced or have continuous action.

Referring to FIG. 4, the system 10 further includes a mechanism 33 for selectively actuating the digital camcorder 20 to a recording mode, which is important such that an image is selectively captured and recorded when the view-finding arm 24 is articulated to a lowered position defined directly in front of a line-of-sight of the user, without the use of intervening elements, and when the line-of-sight is adapted away from an initial rested position. Such a selective recording mechanism 33 includes a toggle switch 32 operably coupled to the view-finding arm 24, which is necessary such that the toggle switch 32 is selectively biased between on and off positions when the view-finding arm 24 is lowered and raised respectively. The selective recording mechanism 33 is designed in such a manner that a user head 11 must be moved along a plane, or a movement of an image must be detected for a predetermined time period in order to actuate the recording sequence. This prevents premature recording of an image based upon unconscious movement of a user head 11 that is not intended to follow motion framed within the view-finding lens 25.

Again referring to FIG. 4, the system 10 further includes a motion sensor 34 operably coupled to the portable headset 22 for detecting movement of the portable headset 22. Such a motion sensor 34 generates an output signal based upon motion detected within the view-finding lens 25. A logic gate 35 is electrically coupled directly to the toggle switch 32 and the motion sensor 34, without the use of intervening elements, wherein the logic gate 35 generates and transmits a control output signal to the view-finding arm 24 and the digital imaging data interface circuit 50 (herein described below) when the toggle switch 32 and the motion sensor 34 transmit output signals that have true values corresponding to predetermined recording parameters. The selective recording mechanism 33 allows a user to record only the images desired by simply articulating the view-finding arm 24 into the proper position for recording, and allows a user to bias the view-finding arm 24 away from a user eye 13 when not recording.

Referring to FIG. 5, the system 10 further includes a mechanism 36 for manually actuating the digital camcorder 20 to a recording mode, which is vital such that an image is manually captured and recorded when the view-finding arm 24 is articulated to a lowered position defined directly in front of a line-of-sight of the user, without the use of intervening elements, and when a designated one of the control buttons 29 is engaged to an on position. Such a manual recording mechanism 36 includes a toggle switch 32 operably coupled to the view-finding arm 24, which is essential such that the toggle switch 32 is selectively biased between on and off positions when the view-finding arm 24 is lowered and raised respectively.

Again referring to FIG. 5, the system 10 further includes a recording switch 37 operably coupled to the portable headset 22. Such a recording switch 37 generates an output signal based upon a corresponding user input. A logic gate 35 is electrically coupled directly to the toggle switch 32 and the recording switch 37, without the use of intervening elements, wherein the logic gate 35 generates and transmits a control output signal to the view-finding arm 24 and the digital imaging data interface circuit 50 when the toggle switch 32 and the recording switch 37 transmit output signals that have true values. The manual recording mechanism 36 offers a user the utmost in operating control over the recording of images through use of the recording switch 37 that initiate the recording sequence. Such operating control allows a user to record images in discrete sequence, thus maximizing the efficiency of recording.

Referring to FIGS. 3, 4 and 5, the system 10 further includes a digital imaging data interface circuit 50 electrically coupled to each of the automatic recording mechanism 31 and the selective recording mechanism 33 and the manual recording mechanism 36 respectively for converting the captured image into a format understood by the digital camcorder 20 and thereby advantageously enabling the digital camcorder 20 to record the captured image identified along the line-of-sight of the view-finding arm 24.

Figure 2:
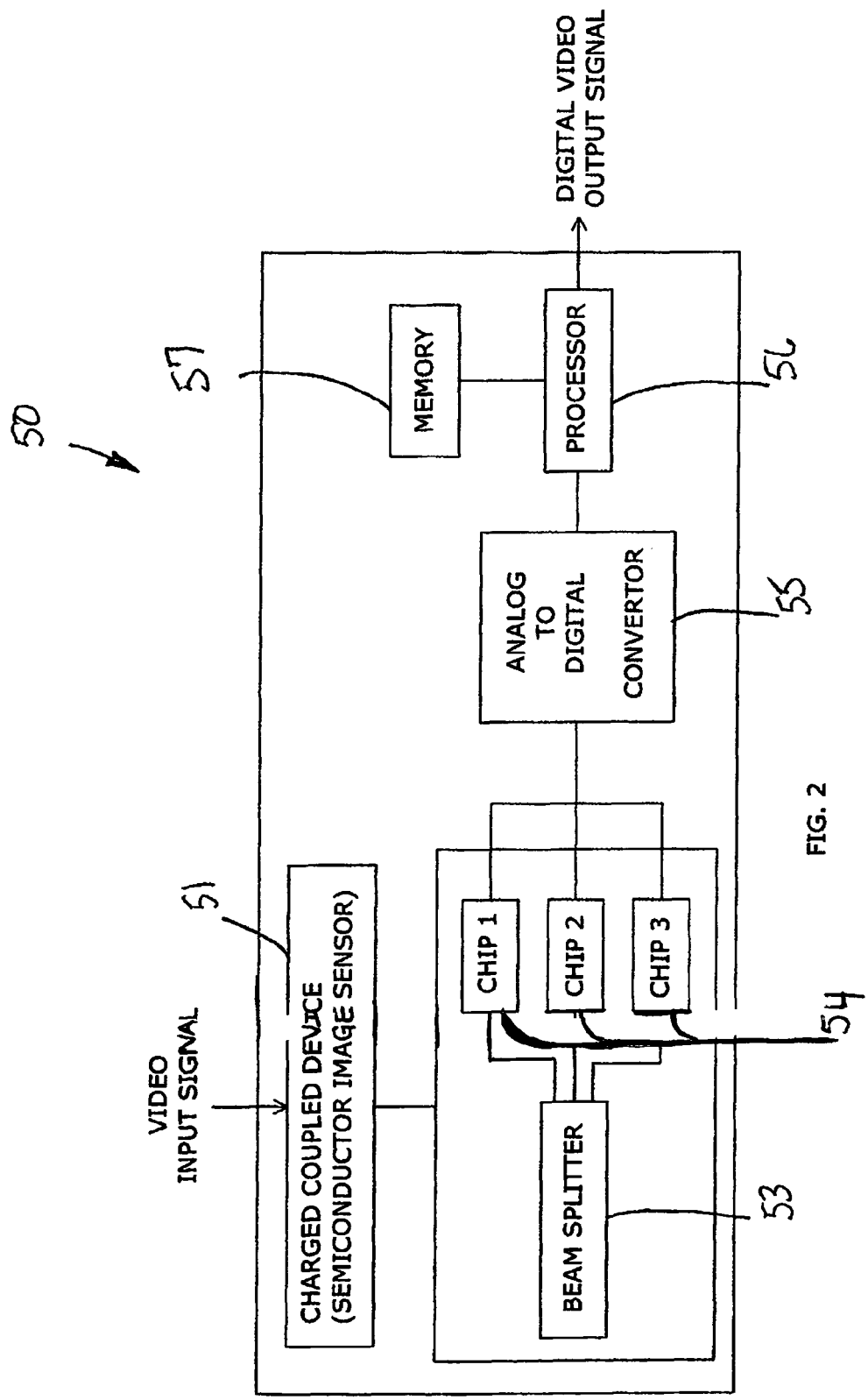
FIG. 2 is a schematic block diagram of the digital image data interface circuit shown in FIG. 1.
Figure 6:
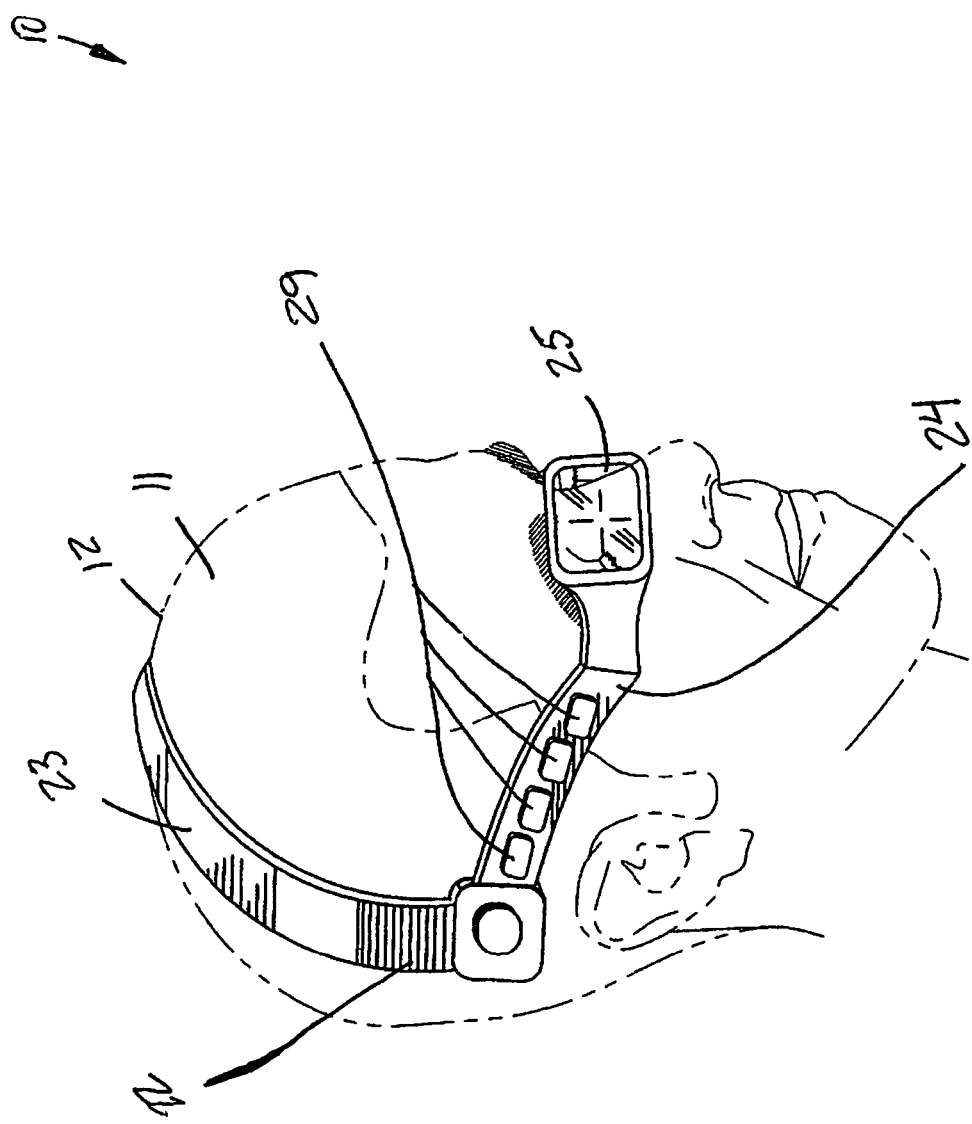
FIG. 6 is a perspective view of the headset showing the view-finding arm articulated to a position in front of as user eye.
Figure 7:
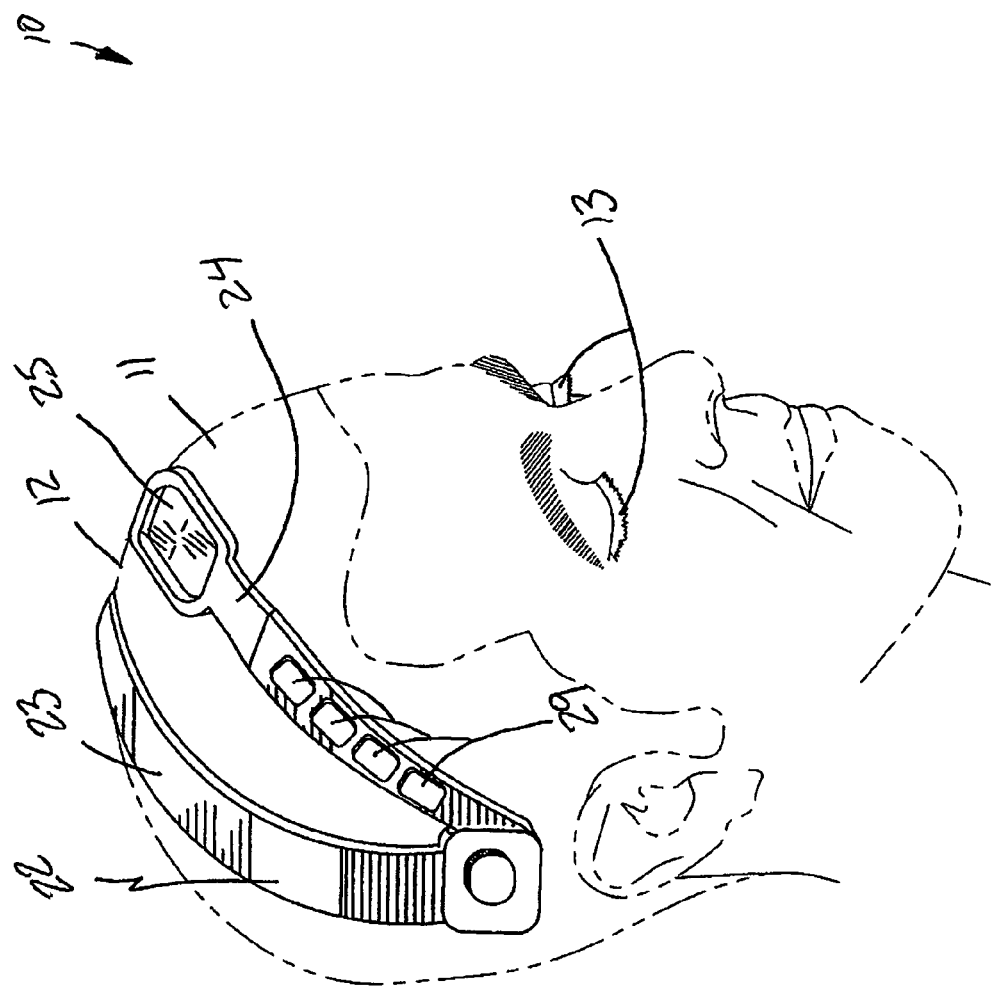
FIG. 7 is a perspective view of the headset shown in FIG. 6 showing the view-finding arm articulated away from a user eye.
Figure 8:
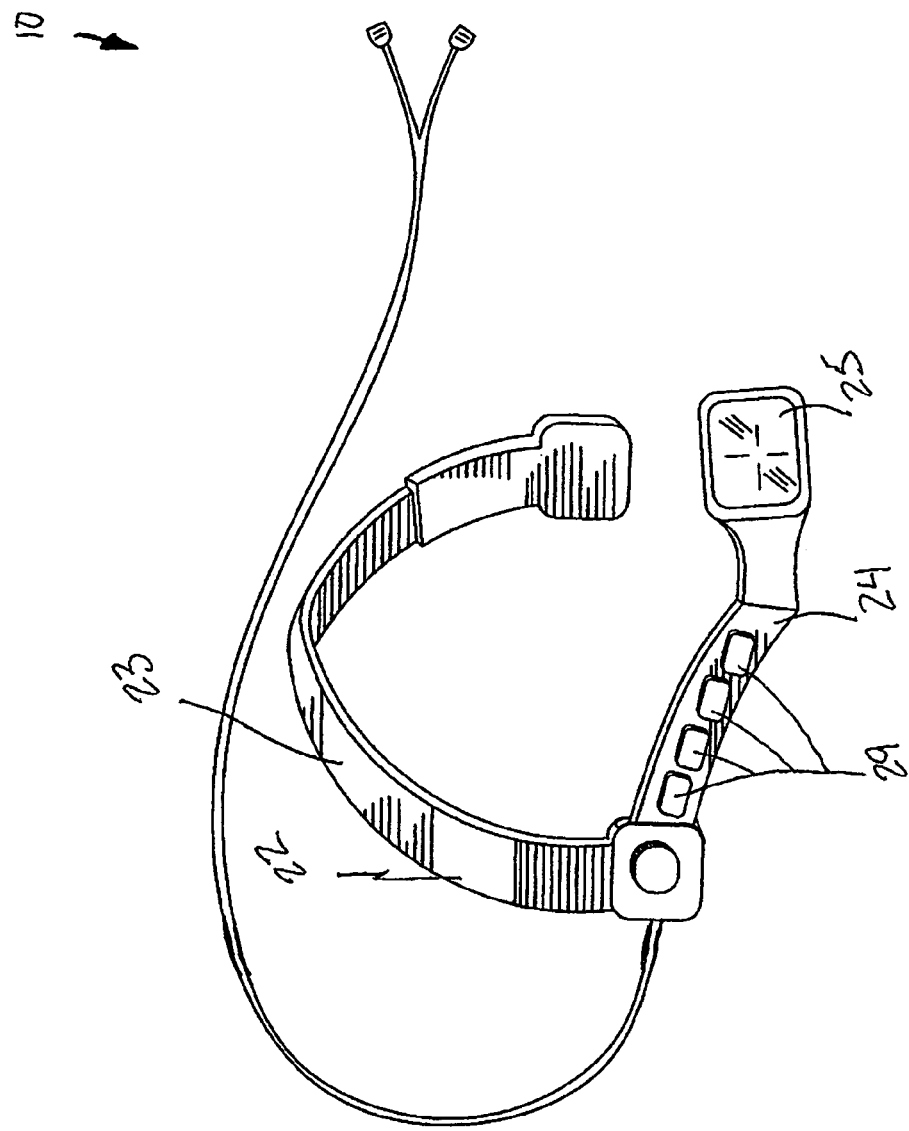
FIG. 8 is a perspective view of the headset removed from a user head.

Referring to FIG. 2, the digital imaging data interface circuit 50 includes a charged coupled device 51 defining a semi-conductor image sensor. Such a charged coupled device 51 receives an image input signal that has a predetermined light intensity level wherein light associated with the captured image is converted into electrons based upon a brightness of the captured image. A beam-splitter 53 is electrically coupled to the charged coupled device 51, and includes a plurality of chips 54. Each of such chips 54 receives a unique version of the image input signal showing a corresponding level of red, green and blue lights respectively and further generates a combined analog image output signal based upon a combined light intensity level of red, green and blue lights.

Again referring to FIG. 2, the digital imaging data interface circuit 50 further includes an analog-to-digital converter 55 electrically coupled to the beam-splitter 53 that receives the analog image output signal. Such an analog-to-digital converter 55 generates a digital image output signal based upon the combined light intensity level of the analog image output signal. A processor 56 is electrically coupled to the analog-to-digital converter 55, and a memory 57 is electrically coupled to the processor 56. Such a memory 57 includes software instructions that interpolates a true color of the light associated with the digital image output signal. Such software instructions include and execute a control logic algorithm.

The control logic algorithm includes the steps of filtering the light intensity levels associated with the red, green, and blue colors, recording the light intensity levels associated with the red, green, and blue colors, and combining the light intensity levels of the red, green, and blue colors to create a full color spectrum of the captured image. In an alternate embodiment, the control logic algorithm includes the steps of interpolating the red, green, and blue light intensity levels, outputting a mosaic of red, green, and blue pixels has the light intensity levels associated therewith, and de-mosaicing the red, green, and blue pixels into an equally sized mosaic has true red, green, and blue colors based upon the red, green and blue light intensity levels of the captured image.

The incorporation of three separate recording mechanisms 31, 33, 36 provides the unexpected benefit of allowing a user to select the recording mode as desired depending on recording conditions and the type of recording being made. For example, a user can record automatically 31 when the action is fast, such as an automobile race, or manually 36 when the action is sporadic, such as a baseball game. In addition, the system 10 offers the ability to hard-wire the portable headset 22 to the digital camcorder 20, or alternatively wirelessly communicates therewith, thereby broadening a user choice of digital camcorders 20 to use in conjunction with the portable headset 22. The benefits described above overcome the previously mentioned prior art shortcomings.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined portable viewfinder and digital camcorder system for enabling a user to automatically toggle the camcorder between various operating modes while maintaining both hands spaced from said digital camcorder, said combined viewfinder and digital camcorder system comprising:
   a digital camcorder provided with a transceiver electrically coupled thereto;
   a portable headset removably positioned on a user head, said portable headset including
      a base member spanning across a top surface of the user head for removably securing said headset to the user head,
      a view-finding arm pivotally mated directly to said base member, said view-finding arm including a view-finding lens operably mated to a distal end thereof,
      a transceiver in communication with said digital camcorder transceiver,
      a user interface electrically coupled directly to said headset transceiver, said user interface including a plurality of control buttons disposed on an outside surface of said view-finding arm,
      means for automatically actuating said digital camcorder to a recording mode such that an image is automatically captured and recorded when said view-finding arm is articulated to a lowered position defined directly in front of a line-of-sight of the user,
      means for selectively actuating said digital camcorder to a recording mode such that an image is selectively captured and recorded when said view-finding arm is articulated to a lowered position defined directly in front of a line-of-sight of the user and when the line-of-sight is adapted away from an initial rested position,
      means for manually actuating said digital camcorder to a recording mode such that an image is manually captured and recorded when said view-finding arm is articulated to a lowered position defined directly in front of a line-of-sight of the user and when a designated one of said control buttons is engaged to an on position, and
      a digital imaging data interface circuit electrically coupled to each of said automatic recording means and said selective recording means and said manual recording means respectively for converting the captured image into a format understood by said digital camcorder and thereby enabling said digital camcorder to record the captured image identified along the line-of-sight of the view-finding arm.

2. The combined portable viewfinder and digital camcorder system of claim 1, wherein said digital imaging data interface circuit comprises:

a charged coupled device defining a semi-conductor image sensor, said charged coupled device receiving an image input signal having a predetermined light intensity level wherein light associated with the captured image is converted into electrons based upon a brightness of the captured image;

a beam-splitter electrically coupled to said charged coupled device, said beam-splitter including a plurality of chips, each of said chips receiving a unique version of said image input signal showing a corresponding level of red, green and blue lights respectively and further generating a combined analog image output signal based upon a combined light intensity level of red, green and blue lights;

an analog-to-digital converter electrically coupled to said beam-splitter and receiving said analog image output signal, said analog-to-digital converter generating a digital image output signal based upon the combined light intensity level of the analog image output signal;

a processor electrically coupled to said analog-to-digital converter; and a memory electrically coupled to said processor, said memory including software instructions that interpolates a true color of the light associated with said digital image output signal, said software instructions including and executing a control logic algorithm.

3. The combined portable viewfinder and digital camcorder system of claim 2, wherein said control logic algorithm comprises the steps of:

filtering the light intensity levels associated with the red, green, and blue colors;

recording the light intensity levels associated with the red, green, and blue colors; and combining the light intensity levels of the red, green, and blue colors to create a full color spectrum of the captured image.

4. The combined portable viewfinder and digital camcorder system of claim 2, wherein said control logic algorithm comprises the steps of:

interpolating the red, green, and blue light intensity levels;

outputting a mosaic of red, green, and blue pixels having the light intensity levels associated therewith; and de-mosaicing the red, green, and blue pixels into an equally sized mosaic having true red, green, and blue colors based upon the red, green and blue light intensity levels of the captured image.

5. The combined portable viewfinder and digital camcorder system of claim 1, wherein said automatic recording means comprises:

a toggle switch operably coupled to said view-finding arm such that said toggle switch is automatically biased between on and off positions when the view-finding arm is lowered and raised respectively.

6. The combined portable viewfinder and digital camcorder system of claim 1, wherein said selective recording means comprises:

a toggle switch operably coupled to said view-finding arm such that said toggle switch is selectively biased between on and off positions when the view-finding arm is lowered and raised respectively;

a motion sensor operably coupled to said headset for detecting movement of the headset, said motion sensor generating an output signal based upon motion detected within said view-finding lens; and a logic gate electrically coupled directly to said toggle switch and said motion sensor wherein said logic gate generates and transmits a control output signal to said view-finding arm and said digital imaging data interface circuit when said toggle switch and said motion sensor transmit output signals having true values corresponding to predetermined recording parameters.

7. The combined portable viewfinder and digital camcorder system of claim 1, wherein said manual recording means comprises:

a toggle switch operably coupled to said view-finding arm such that said toggle switch is selectively biased between on and off positions when the view-finding arm is lowered and raised respectively;

a recording switch operably coupled to said headset, said recording switch generating an output signal based upon a corresponding user input; and a logic gate electrically coupled directly to said toggle switch and said recording switch wherein said logic gate generates and transmits a control output signal to said view-finding arm and said digital imaging data interface circuit when said toggle switch and said recording switch transmit output signals having true values.

8. A combined portable viewfinder and digital camcorder system for enabling a user to automatically toggle the camcorder between various operating modes while maintaining both hands spaced from said digital camcorder, said combined viewfinder and digital camcorder system comprising:

a digital camcorder provided with a transceiver electrically coupled thereto;

a portable headset removably positioned on a user head, said portable headset including a base member spanning across a top surface of the user head for removably securing said headset to the user head, a view-finding arm pivotally mated directly to said base member, said view-finding arm including a view-finding lens operably mated to a distal end thereof, a transceiver in communication with said digital camcorder transceiver, wherein said digital camcorder transceiver is hard-wired to said headset transceiver, or said digital camcorder transceiver is in wireless communication with said headset transceiver, a user interface electrically coupled directly to said headset transceiver, said user interface including a plurality of control buttons disposed on an outside surface of said view-finding arm, means for automatically actuating said digital camcorder to a recording mode such that an image is automatically captured and recorded when said view-finding arm is articulated to a lowered position defined directly in front of a line-of-sight of the user, means for selectively actuating said digital camcorder to a recording mode such that an image is selectively captured and recorded when said view-finding arm is articulated to a lowered position defined directly in front of a line-of-sight of the user and when the line-of-sight is adapted away from an initial rested position, means for manually actuating said digital camcorder to a recording mode such that an image is manually captured and recorded when said view-finding arm is articulated to a lowered position defined directly in front of a line-of-sight of the user and when a designated one of said control buttons is engaged to an on position, and a digital imaging data interface circuit electrically coupled to each of said automatic recording means and said selective recording means and said manual recording means respectively for converting the captured image into a format understood by said digital camcorder and thereby enabling said digital camcorder to record the captured image identified along the line-of-sight of the view-finding arm.

9. The combined portable viewfinder and digital camcorder system of claim 8, wherein said digital imaging data interface circuit comprises:
- a charged coupled device defining a semi-conductor image sensor, said charged coupled device receiving an image input signal having a predetermined light intensity level wherein light associated with the captured image is converted into electrons based upon a brightness of the captured image;
- a beam-splitter electrically coupled to said charged coupled device, said beam-splitter including a plurality of chips, each of said chips receiving a unique version of said image input signal showing a corresponding level of red, green and blue lights respectively and further generating a combined analog image output signal based upon a combined light intensity level of red, green and blue lights;
- an analog-to-digital converter electrically coupled to said beam-splitter and receiving said analog image output signal, said analog-to-digital converter generating a digital image output signal based upon the combined light intensity level of the analog image output signal;
- a processor electrically coupled to said analog-to-digital converter; and
- a memory electrically coupled to said processor, said memory including software instructions that interpolates a true color of the light associated with said digital image output signal, said software instructions including and executing a control logic algorithm.

10. The combined portable viewfinder and digital camcorder system of claim 9, wherein said control logic algorithm comprises the steps of:
- filtering the light intensity levels associated with the red, green, and blue colors;
- recording the light intensity levels associated with the red, green, and blue colors; and
- combining the light intensity levels of the red, green, and blue colors to create a full color spectrum of the captured image.

11. The combined portable viewfinder and digital camcorder system of claim 9, wherein said control logic algorithm comprises the steps of:
- interpolating the red, green, and blue light intensity levels;
- outputting a mosaic of red, green, and blue pixels having the light intensity levels associated therewith; and
- de-mosaicing the red, green, and blue pixels into an equally sized mosaic having true red, green, and blue colors based upon the red, green and blue light intensity levels of the captured image.

12. The combined portable viewfinder and digital camcorder system of claim 8, wherein said automatic recording means comprises:
- a toggle switch operably coupled to said view-finding arm such that said toggle switch is automatically biased between on and off positions when the view-finding arm is lowered and raised respectively.

13. The combined portable viewfinder and digital camcorder system of claim 8, wherein said selective recording means comprises:
- a toggle switch operably coupled to said view-finding arm such that said toggle switch is selectively biased between on and off positions when the view-finding arm is lowered and raised respectively;
- a motion sensor operably coupled to said headset for detecting movement of the headset, said motion sensor generating an output signal based upon motion detected within said view-finding lens; and
- a logic gate electrically coupled directly to said toggle switch and said motion sensor wherein said logic gate generates and transmits a control output signal to said view-finding arm and said digital imaging data interface circuit when said toggle switch and said motion sensor transmit output signals having true values corresponding to predetermined recording parameters.

14. The combined portable viewfinder and digital camcorder system of claim 8, wherein said manual recording means comprises:
- a toggle switch operably coupled to said view-finding arm such that said toggle switch is selectively biased between on and off positions when the view-finding arm is lowered and raised respectively;
- a recording switch operably coupled to said headset, said recording switch generating an output signal based upon a corresponding user input; and
- a logic gate electrically coupled directly to said toggle switch and said recording switch wherein said logic gate generates and transmits a control output signal to said view-finding arm and said digital imaging data interface circuit when said toggle switch and said recording switch transmit output signals having true values.

* * * * *